United States Patent [19]

Ulivi

[11] 4,033,490
[45] July 5, 1977

[54] MANUFACTURE OF A WINDOW BY BREAKING THE EDGES OF A SHEET OF GLASS ALONG A SCORE

[75] Inventor: Moreno Ulivi, Pisa, Italy

[73] Assignee: Saint-Gobain Industries, Neuilly-sur-Seine, France

[22] Filed: July 28, 1976

[21] Appl. No.: 709,405

[30] Foreign Application Priority Data

Aug. 1, 1975  France .................. 75.24075

[52] U.S. Cl. ........................ 225/1; 225/2; 225/93.5; 225/96.5; 225/97
[51] Int. Cl.² .................. B26F 33/06; C03B 33/04
[58] Field of Search .............. 225/1, 2, 93.5, 96, 225/96.5, 97

[56] References Cited

UNITED STATES PATENTS

| | | | |
|---|---|---|---|
| 1,885,099 | 10/1932 | Hively et al. | 33/27 K |
| 3,215,345 | 11/1965 | Ferguson | 225/93.5 |
| 3,305,149 | 2/1967 | Lacey | 225/2 |
| 3,430,328 | 4/1969 | Powell | 29/407 |
| 3,613,974 | 10/1971 | Chatelain et al. | 225/93.5 |
| 3,730,408 | 5/1973 | Dahlberg et al. | 225/2 |
| 3,756,482 | 9/1973 | De Torre | 225/2 |

FOREIGN PATENTS OR APPLICATIONS

| | | |
|---|---|---|
| 722,524 | 10/1968 | Belgium |
| 1,336,843 | 7/1963 | France |
| 2,179,706 | 11/1973 | France |
| 1,461,463 | 11/1966 | France |
| 1,444,569 | 5/1966 | France |
| 1,055,768 | 4/1959 | Germany |
| 724,725 | 2/1955 | United Kingdom |

*Primary Examiner*—Frank T. Yost
*Attorney, Agent, or Firm*—Pennie & Edmonds

[57] ABSTRACT

An apparatus is disclosed for severing the peripheral portion of a sheet of glass along a line scored on the surface of the glass comprising means for applying heat to the glass adjacent the corners of the score to at least partially sever the peripheral portion and a mechanical device which engages and breaks off the section of the peripheral portion which was not severed by heat.

9 Claims, 7 Drawing Figures

Fig_1

Fig_5

MANUFACTURE OF A WINDOW BY BREAKING THE EDGES OF A SHEET OF GLASS ALONG A SCORE

The present invention relates to a method and apparatus for breaking or severing the edge portions of glass sheets along a previously scored severing line which may have any desired shape.

The invention relates, more particularly, to the automated manufacture of automobile windows. Although it is known to break strips of glass along a straight score, the problem is, however, quite different when it is necessary to automatically and effectively break a sheet of glass along a score which rather than being straight, may be closed and have, for example, a trapezoidal or rhombic shape with rounded or sharp corners. In an automated production line for manufacturing automobile windows, the severing or breaking unit is situated up-stream from the finishing unit or units which grind the edges of the windows prior to the tempering, or curving and tempering, operations. The breaking operation must, therefore, be effected rapidly in order to adequately supply one or often several automated finishing units. The breaking operations must, moreover, be reliably performed so that a sheet of glass with unbroken or only partially broken edge portions does not reach the grinder since the latter can only operate within relatively limited dimensional tolerances. The breaking operation must, furthermore, provide sharp, clean edges without chips or microfissures since during the tempering operation, such edge faults form starting points for breakage of the window. When the breaking operation is not carried out properly, it is sometimes possible to continue grinding the edges of the glass until these faults disappear. However, such an operation is time comsuming and costly due to the additional wear on the diamond-tipped grinding element.

It has been proposed to break glass sheets along a score solely by use of thermal devices which apply heat to the glass. When such devices are used, the break is clean, however, the weight of the edge portion of the glass sheet is often insufficient by itself to automatically separate the trim from the sheet. It has also been proposed to break off the edge portions or trim from glass sheets solely by the use of mechanical devices. For example, French Pat. No. 1,370,508 and French patent application Ser. No. 74.14357, assigned to the assignee of the present application, disclose mechanical devices which use hammers to tap the glass sheet in the vicinity of the score causing it to expand until the edge portions separate from the parent sheet. Such mechanical devices also use rollers or the like for exerting pressure on one of the surfaces or both surfaces of the glass sheet at one or both sides of the severing line, as described in U.S. Pat. Nos. 3,137,425; 2,178,085; 3,259,286; 3,300,112 and French Pat. No. 1,465,518, assigned to the assignee of the present application. Mechanical breaking devices of this type may also have abutments which come into contact with the trim to be detached from the glass sheet. They may also have a roller which is partially filled with water as disclosed in U.S. Pat. No. 3,770,173. However, although mechanical devices of this kind always break off the trim, they also often produce faults which are incompatible with automatic and subsequent tempering. In addition, it is difficult to produce, with mechanical devices of this type, windows of certain shapes, particularly trapezoidal windows, and, moreover, glass sheets of certain thicknesses cannot be effectively broken.

The present invention obviates these disadvantages of the prior art processes for breaking glass by combining the application to heat to produce a clean, sharp break along at least part of the score with a subsequent mechanical breaking operation to break off the trim which was not severed by heating. The apparatus of the invention for breaking off the trim along a closed line previously scored in the surface of the glass sheet comprises thermal devices for applying heat to the glass adjacent the markedly curved sections of the score, such as the corners of the score outline, and at least one mechanical device which acts on the glass adjacent the straighter section of the score to break off the trim which was not severed by the application of heat.

Preferrably the thermal devices are blow pipes disposed so that their flames are directed against the trim to be severed. In accordance with the preferred embodiment of the invention, the mechanical breaking device includes a gripping member which engages the trim and exerts a bending moment thereon to break it off the glass sheet. Advantageously, the gripping member is U-shaped and has one leg which is inclined at an obtuse angle with respect to the base of the U and extends outwardly from the other leg. The gripping member is pivotally mounted at the base of the U on a shaft which is perpendicular to the plane of the U and supported by the frame of the apparatus. The member is positioned, at the start of the breaking operation above the edge adjacent the edge of the sheet with the open end of the U facing the glass and with the outwardly extending leg projecting a short distance over the trim to be severed. The glass sheet is then moved into contact with the gripping member causing it to pivot about the shaft so that the two legs of the U engage the trim therebetween and exert a bending moment thereon to break it off the parent sheet.

Other objects, features, and advantages of the present invention will be made apparent in the following detailed description thereof which is provided with reference to the accompanying drawings in which.

Figure 1:
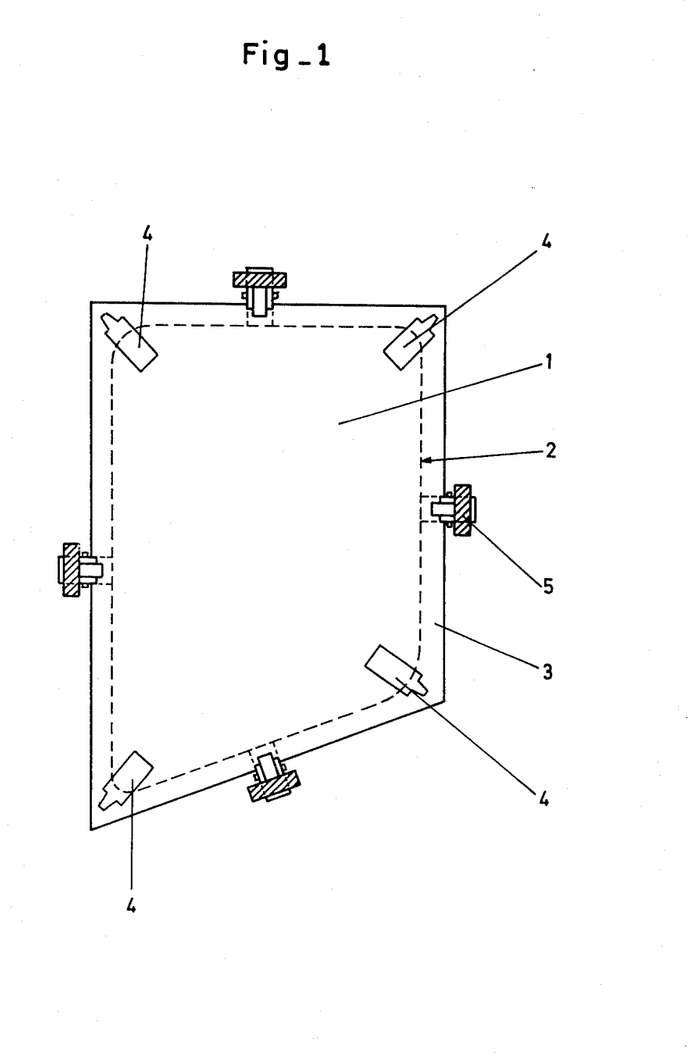
FIG. 1 is a plan view of the apparatus of the invention illustrating the disposition of thermal and mechanical breaking devices about a severing line scored on a glass sheet.

Referring now to the drawings, FIG. 1 shows a sheet of glass 1 on which a closed, preferably semi-through, score 2 has been cut with a cutting wheel. In accordance with the invention, blow pipes 4 disposed at the corners of the score outline are used to produce a clean, sharp break along the score 2 by the application of heat to the peripheral portion 3. Mechanical breaking devices 5, disposed along the sheet 1 adjacent the straightest sections of the score 2 then break off the peripheral portions 3 which are not completely severed by the application of heat.

Figure 2:
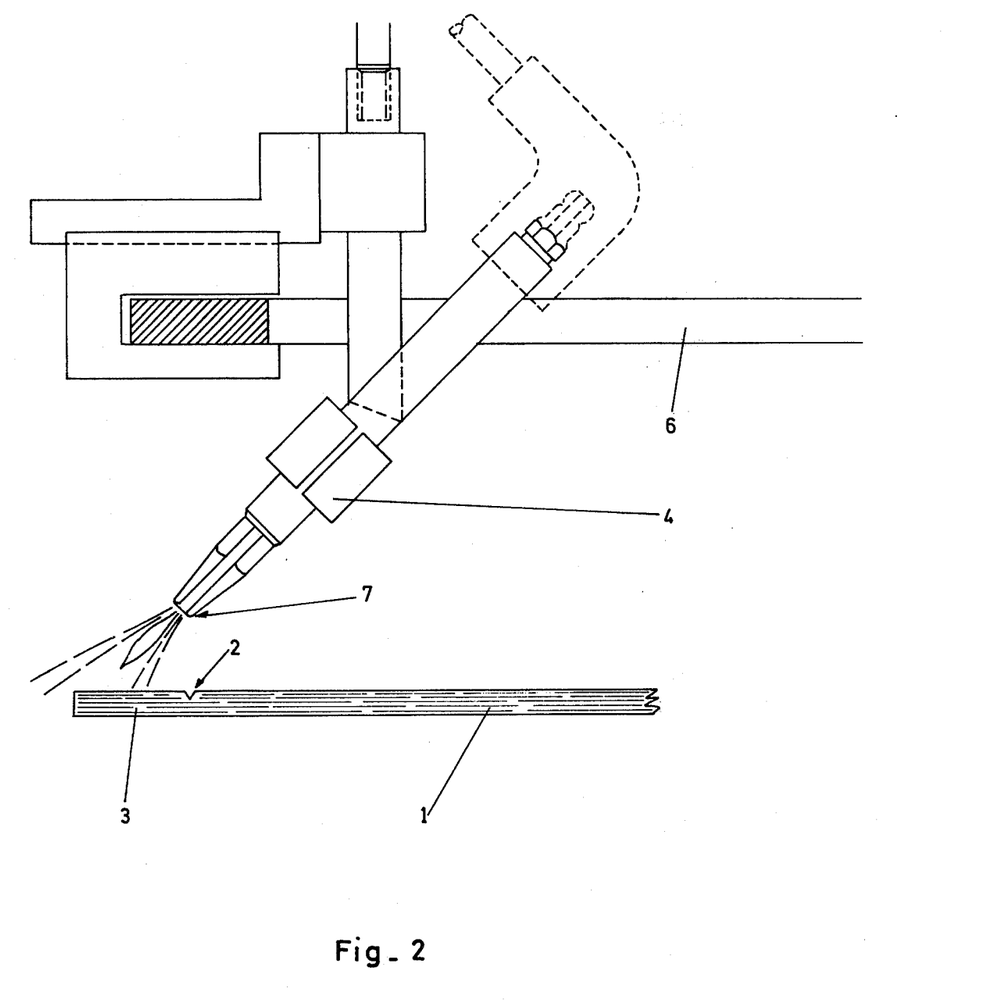
FIG. 2 is a sectional view of a blast pipe of a thermal breaking device of FIG. 1.

As shown in FIG. 2, each of the blow pipes 4 is attached to a frame 6 and positioned so that the end of the nozzle 7 is generally at a point directly above the score 2 and approximately 3 cm. above the surface of the glass sheet 1. Each pipe is inclined with respect to the surface of the sheet 1 at an angle such that the flame is directed only at the peripheral portion 3 to be detached.

As shown in FIGS. 3 to 7, each of the mechanical breaking devices 5 includes a U-shaped gripping member 8 having a branch or leg 9 which is inclined at an obtuse angle with respect to the baSe of the U and extends outwardly from the other leg 10. The gripping member 8 is pivotally mounted about a stationary shaft 11 which extends through the base of and is perpendicular to the plane of the U. The shaft 11 is secured to one end of arm 12 the other end of which is attached to a slotted member 20 which fits on frame 6 in a manner such that its position with respect to the frame can be adjusted.

The end of the leg 9 of the gripping member 8 supports a shaft 13 on which is mounted a freely rotatable roller 14 and the inner face of leg 10 is provided with a flexible rubber covering 15. The lengths of the legs 9 and 10 are such that the distance from the end of leg 10 to a plane perpendicular to the longitudinal axis of leg 10 and passing through shaft 13 is substantially equal to the width of the peripheral portion or trim 3 to be severed.

Figure 3:
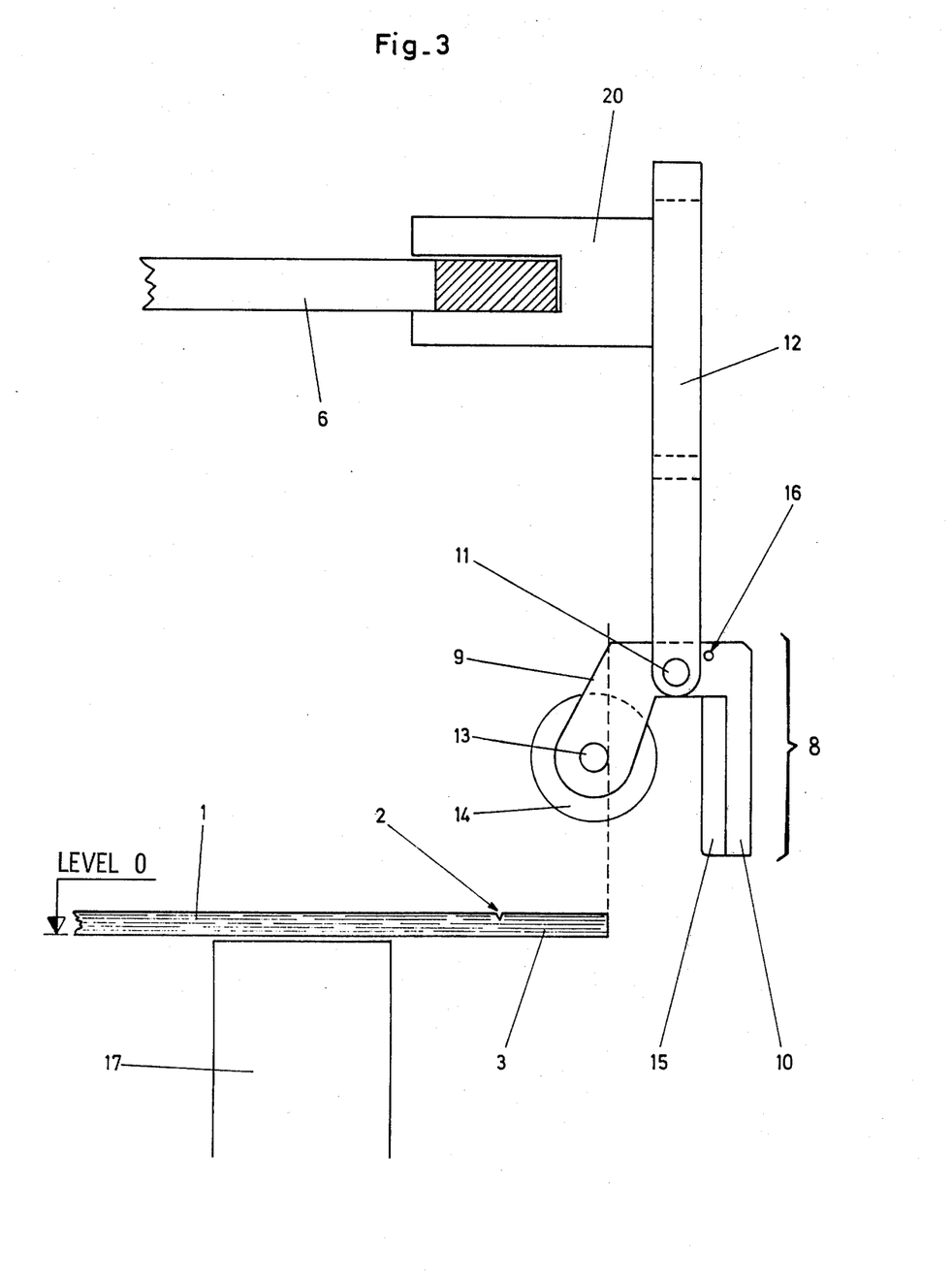
FIG. 3 is a diagrammatic sectional view of a mechanical breaking device of the invention in the initial position at the start of a severing operation.

The position of the axis 11, the dinensions and the weight of each of the branches 9 and 10 and of the roller 14 are such that when the gripping member 8 is in the initial or waiting position prior to the start of the breaking operation, the open end of the U faces the sheet of glass 1 disposed on a vertically movable platform 17 which is located below member 8 in the present apparatus. In waiting position leg 10 of member 8 is maintained in a substantially vertical position, as shown in FIG. 3, by a stud 16 which projects from the base of the U and abuts against arm 12. The leg 9, on the other hand, is inclined from the vertical toward the center of the glass sheet 1 so that the roller 14 on its end extends further over the sheet than the portion of the leg closer to the base of the U.

For optimum performance, the position of the gripping member 8 with respect to the sheet of glass should be such that a line projected from the shaft 13 perpendicularly to the surface of the glass intersects the trim 3 at a point close to the edge or end of the sheet 1. Thus, as shown in FIG. 3, when the gripping element 8 is properly positioned, all its parts, including roller 14, are on the side of the score 2 furthest from the center of sheet 1, i.e. to the right of score 2 as viewed in FIG. 3, and only the end portion of leg 9 and part of roller 14 extend over the trim 3 while leg 10 and the other portions of member 8 are outside the edge of the glass.

The positioning of the gripping member 8 in the plane parallel to the plane of the sheet 1 is effected by adjusting the fit of the slotted member 20 on the frame 6 so the legs 9 and 10 are at the desired location with respect to score 2 and the edge of the sheet. The vertical distance from the surface of the sheet is adjusted by an adjustment of the length of arm 12.

Figure 4:
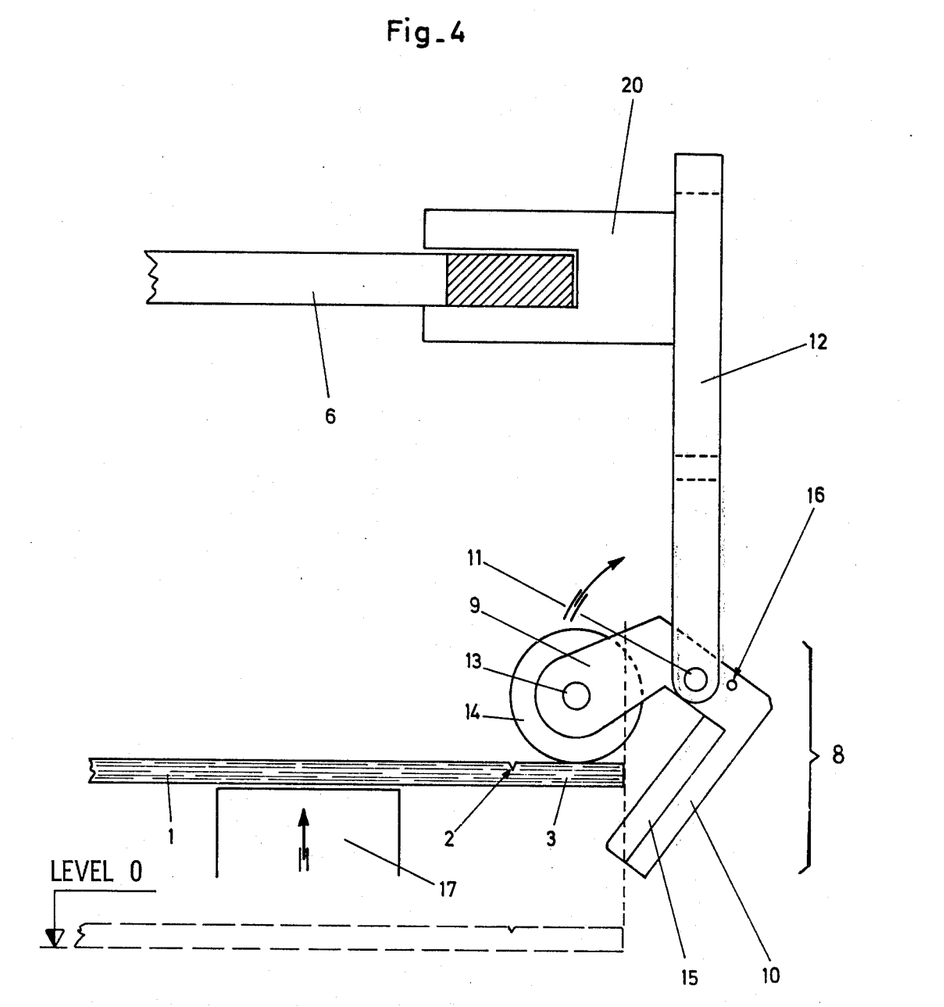
FIG. 4 is a view similar to that of FIG. 3 showing the mechanical breaking device at the moment of contact with the glass sheet.
Figure 5:
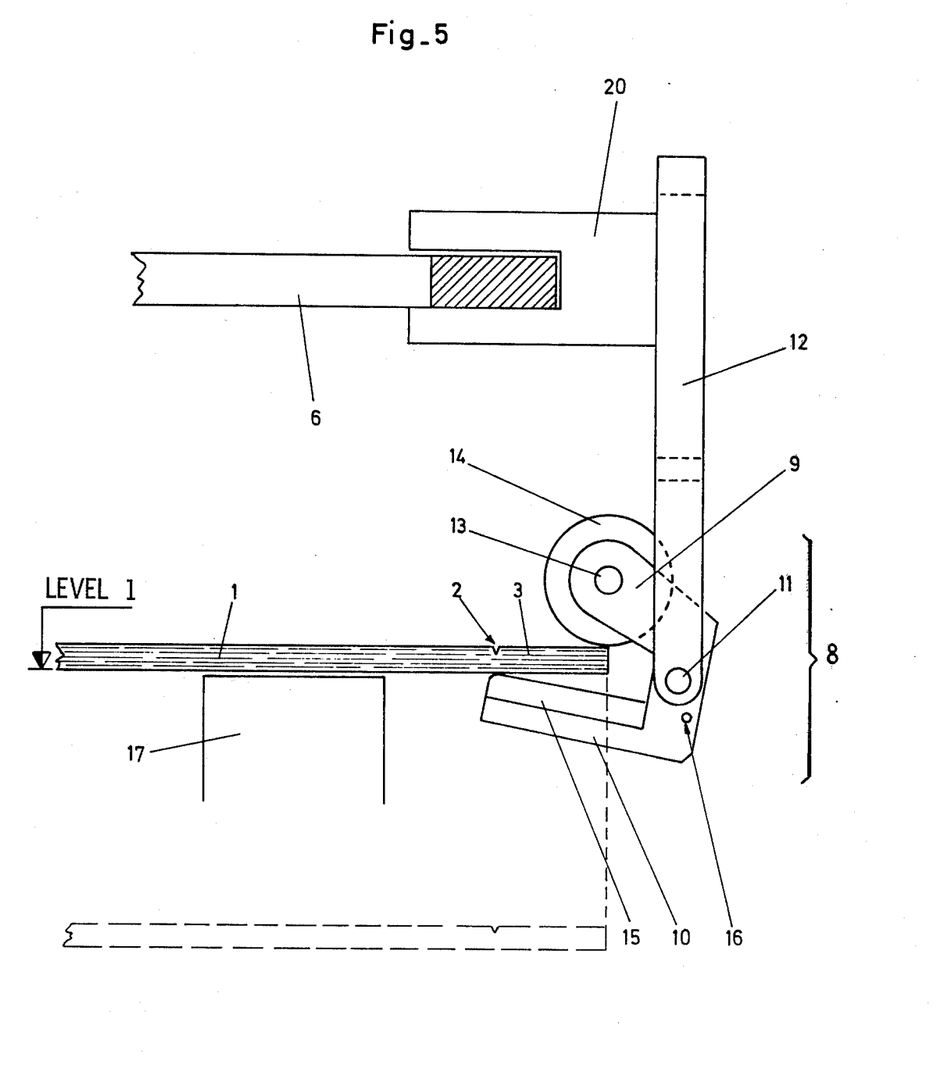
FIG. 5 is a view similar to that of FIG. 3 showing the mechanical breaking device during the operation of the thermal breaking devices.
Figure 6:
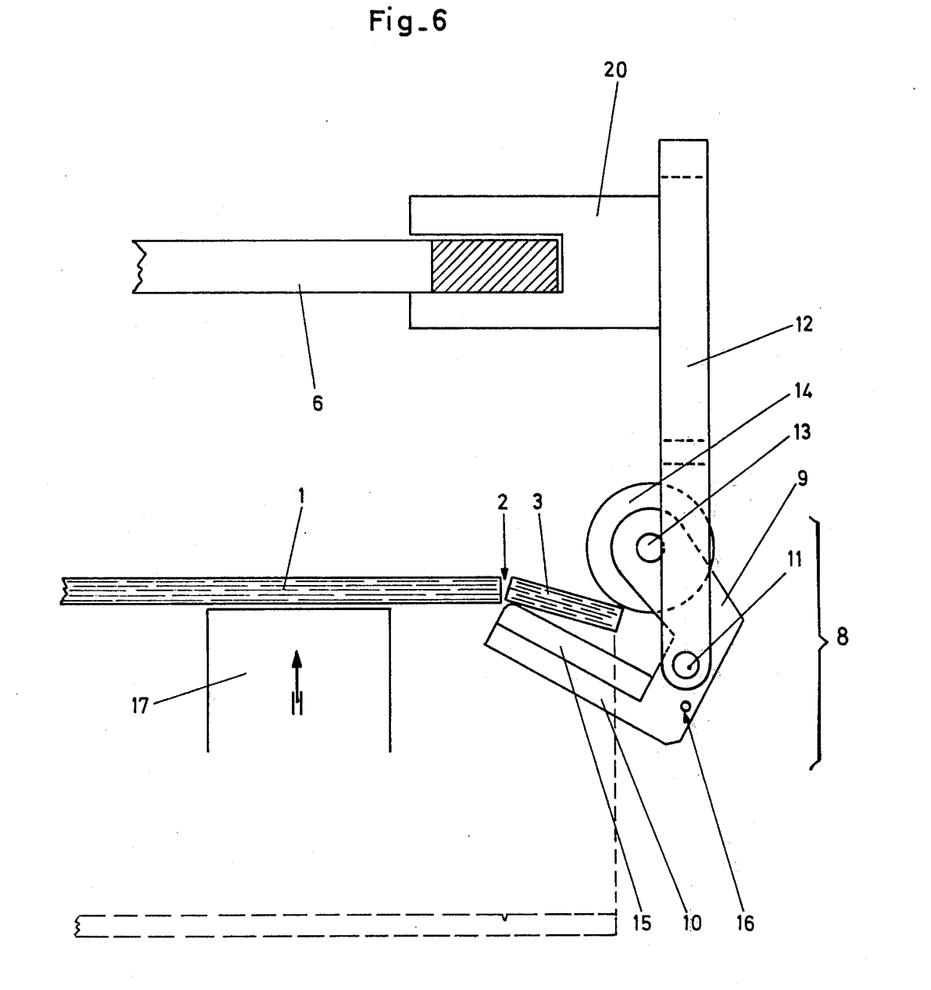
FIG. 6 is a view similar to that of FIG. 3 showing the mechanical breaking device during the mechanical breaking stage of the severing operations.
Figure 7:
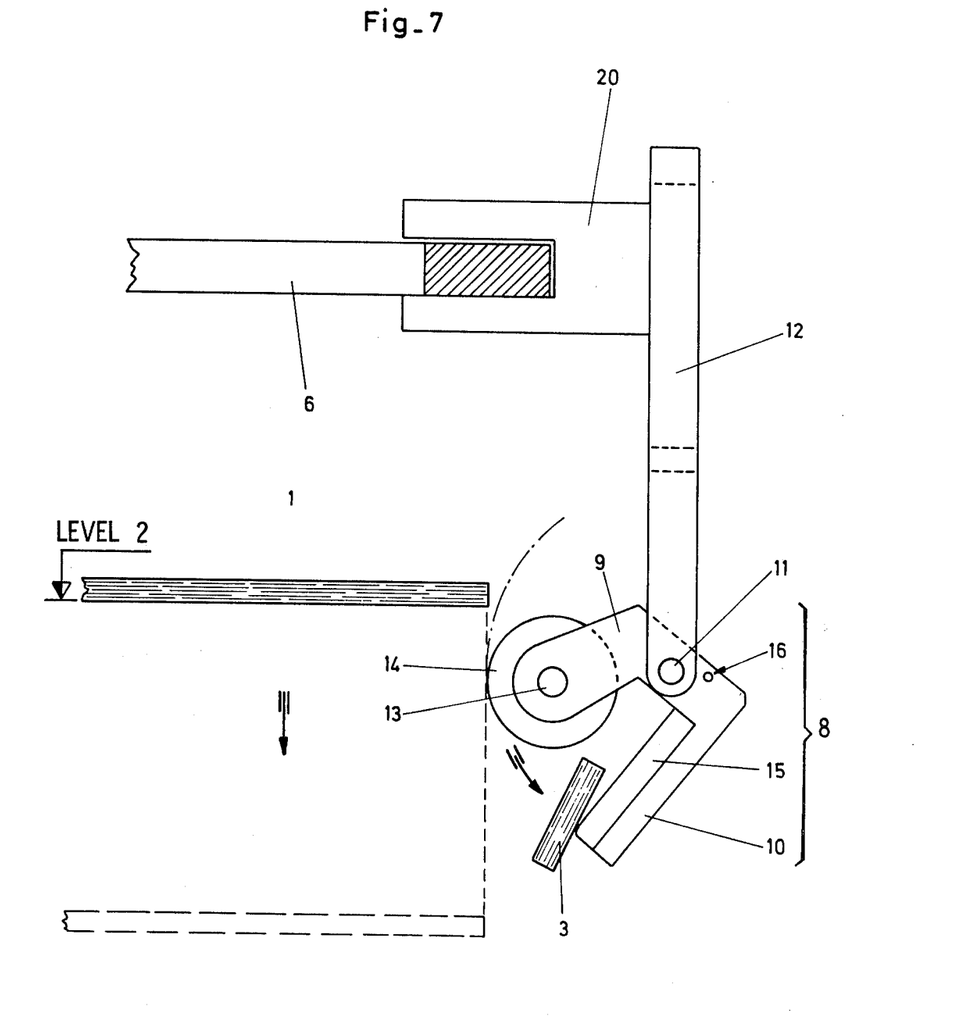
FIG. 7 is a view similar to that of FIG. 3 showing the mechanical breaking device at the end of the severing operation.

In operation, the sheet of glass 1, on which a severing line has just been scored by a cutting wheel, is transferred to the vertically movable platform 17, which at the start of the operation is at level 0 as shown in FIG. 3. The sheet 1 is centered with respect to the frame 6 and thus with respect to the thermal and mechanical breaking devices mounted thereon. The glass sheet is then raised until the trim 3 comes into contact with each of the rollers 14, as shown in FIG. 4. As the sheet of glass continues to be raised, it forces each of the gripping members 8 to pivot about their respective shafts 11. The gripping members 8 then move astride the sheet of glass and continue to pivot into the position shown in FIG. 5. In this position of members 8, the rollers 14 are in contact with the upper face of the trim 3, and the flexible covering 15 on leg 10 is immediately adjacent to or touching the lower surface of the trim 3. At this instant, the sheet of glass ceases to be raised and is at level 1. The blow pipes 4 are then lit with their flames directed to the corners of the score 2 causing the heated portions of the glass to break and increase the opening of the score 2. The severed trim 3 portions then automatically drop off. The blow pipes are turned off and the lifting platform raises the sheet of glass 1 by a few millimeters, for example, 20–25 mm. toward level 2 shown in FIG. 7. At this stage of the operation, as shown in FIG. 6, the ends of the legs 10 of the gripping members 8 form supports beneath the sheet of glass in the proximity of the score 2 and the rollers 14 bend the end of the trim 3, thereby detaching the sections of the trim which were not completely severed by the application of heat. Driven by their weights, the gripping members 8 then pivot about their respective shafts 11 and, as shown in FIG. 7, return to the waiting positions which they occupied in FIG. 3.

The same breaking operation can be accomplished with a stationary sheet of glass and movable breaking devices or with a mutual movement of both. The severing operation may also be effected with the gripping members disposed beneath the glass sheet.

I claim:

1. An apparatus for severing the peripheral portion of a sheet of glass along a line of varying curvature scored on the surface of the glass comprising means for applying heat to the glass adjacent markedly curved sections of said score to at least partially sever said portion and mechanical means for breaking off said portion in the event it is not severed by application of heat, said mechanical means acting on the glass adjacent a straighter section of said score and subsequent to the application of heat by said first named means.

2. Apparatus according to claim 1 wherein said means for applying heat include blow pipes disposed so that the flames therefrom are directed at said portion to be severed.

3. Apparatus according to claim 1 including a frame and wherein said mechanical means includes at least one U-shaped member pivotally supported on said frame, said member having a base and a pair of legs extending therefrom, and means for bringing said sheet and said member into contact with each other, said member being positioned with respect to the sheet so that upon contact therewith said legs are pivoted into engagement with said portion to be severed and exert a bending moment thereon.

4. Apparatus according to claim 3 wherein one of said legs extends at an obtuse angle with respect to said base and outwardly from said other leg and wherein, prior to engagement with said sheet, said member is positioned with the open end of said U facing said sheet and with only the end portion of said one leg extending over the glass.

5. Apparatus according to claim 4 wherein said member is pivotally mounted at its base on a shaft which is supported by said frame and extends substantially perpendicularly to the plane of the U-shaped member.

6. Apparatus according to claim 5 including a roller rotatably mounted on said end portion of said one leg.

7. Apparatus according to claim 6 wherein said shaft supporting said member is stationary and the sheet is moved into engagement with said member.

8. Apparatus according to claim 7 wherein the length of said other leg is greater than the width of said peripheral portion to be severed.

9. A method for severing the peripheral portion of a sheet of glass along a line of varying curvature scored on the surface of the sheet comprising the steps of first applying heat to the glass adjacent markedly curved sections or corners of said score to at least partially sever said peripheral portion, and subsequently applying a bending force to, and only at a region of, said peripheral portion which was not severed by application of heat, to break off said portion.

* * * * *

UNITED STATES PATENT AND TRADEMARK OFFICE
CERTIFICATE OF CORRECTION

PATENT NO. : 4,033,490

DATED : July 5, 1977

INVENTOR(S) : Moreno Ulivi

It is certified that error appears in the above—identified patent and that said Letters Patent are hereby corrected as shown below:

Column 1, line 56, "2,178,085" should read -- 3,178,085 --;

Column 1, line 65, "automatic" should read -- automation --;

Column 2, line 5, "to heat" should read -- of heat --.

Signed and Sealed this

Fourth Day of October 1977

[SEAL]

Attest:

RUTH C. MASON
Attesting Officer

LUTRELLE F. PARKER
Acting Commissioner of Patents and Trademarks